(Model.)
W. J. DIXON.
CHURN.
No. 249,320. Patented Nov. 8, 1881.
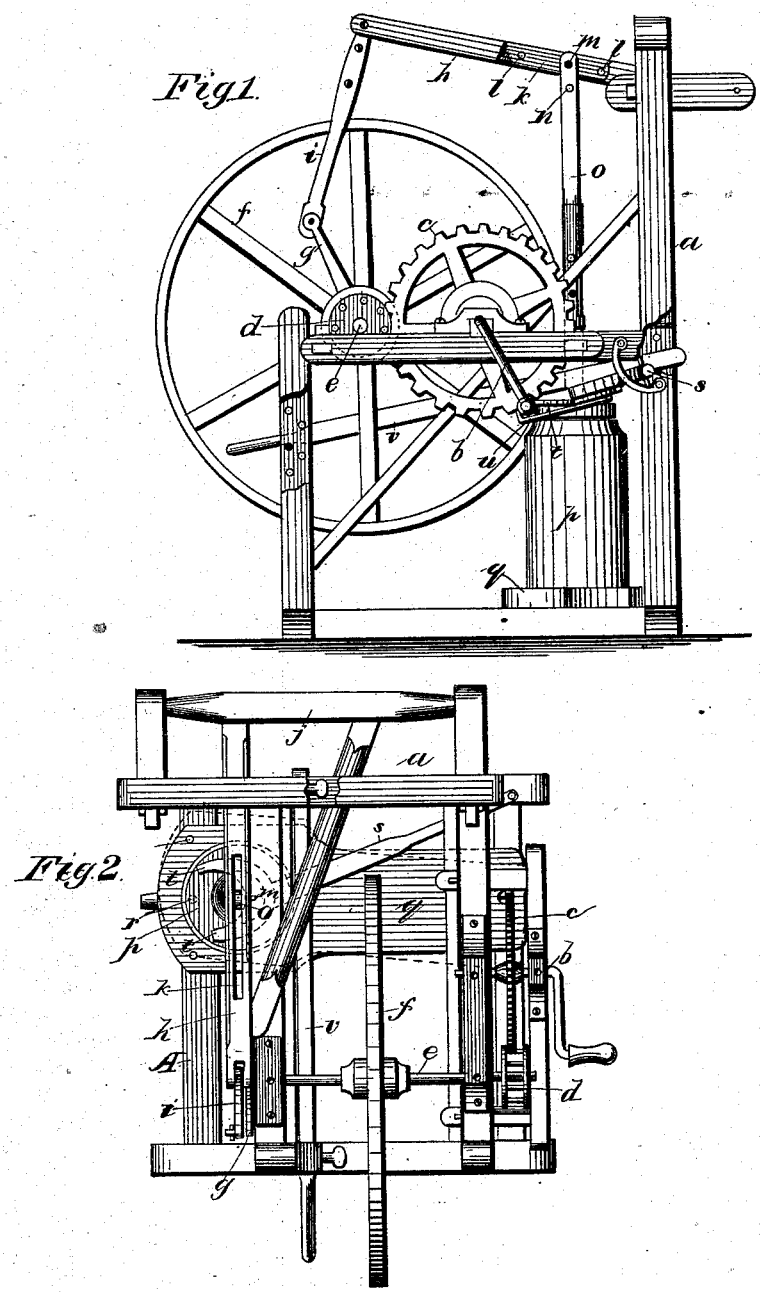
WITNESSES:
INVENTOR:
ATTORNEYS.

UNITED STATES PATENT OFFICE.

WILLIAM J. DIXON, OF WHITE'S CREEK, WEST VIRGINIA.

CHURN.

SPECIFICATION forming part of Letters Patent No. 249,320, dated November 8, 1881.

Application filed May 6, 1881. (Model.)

*To all whom it may concern:*

Be it known that I, WILLIAM J. DIXON, of White's Creek, Wayne county, West Virginia, have invented a new and useful Improvement in Churns; and I do hereby declare that the following is a full, clear, and exact description of the same, reference being had to the accompanying drawings, forming part of this specification, in which—

Figure 1 is a side elevation, and Fig. 2 is a plan view.

My invention relates to improvements in reciprocating churns; and it consists, first, in imparting a reciprocating motion to a churn-dasher by means of gearing revolving a crank-shaft connected with a vibrating lever provided with a slot, in which the upper end of the dasher-rod may be adjusted to vary the length of stroke of the dasher according to the amount of milk in the churn, the latter (seated on an adjustable supporting-board having one end pivoted to a sill of the churn-frame) being also adapted to be adjusted to correspond with the adjustment of the dasher-rod.

My invention further consists of an arm provided with a yoke at one end straddling the dasher-rod and resting on the head or lid of the churn, the opposite end of the arm being supported in the frame, and the arm passing through a loop secured to the lower face of a lever pivoted in a bracket, and having its fulcrum adjustable therein and its free end adapted to be adjusted and held in any desired position, whereby the churn is firmly held in place during the operation of churning; and the holding devices of the churn are adapted to be applied to churns of different heights.

In the accompanying drawings, $a$ represents the churn-frame, in which is journaled the crank-shaft $b$, to which the power is applied, carrying the cog-wheel $c$, gearing into the lantern-wheel $d$ on the crank-shaft $e$, carrying the fly-wheel $f$ and crank $g$, connected at its outer end with the vibrating lever $h$ by the rod $i$, the opposite end of the vibrating lever $h$ being secured to the rock-shaft $j$, journaled in the churn-frame. The vibrating lever $h$ is provided with a slot, $k$, near its middle and three or more adjusting-holes, $l$, in its sides opposite each other, through either two opposite ones of which a pin, $m$, may be inserted, and also through one of a series of holes, $n$, in the upper end of the dasher-rod $o$, whereby the dasher-rod is pivotally secured to the vibrating lever $h$, and by means of the gearing above described a rapid reciprocating movement may be imparted to the dasher operating in the churn $p$.

It will be seen that by coupling the dasher-rod in the forward holes in the slot the length of stroke of the dasher will be greater, and that by adjusting the pin farther back in the slot the length of stroke of the dasher will be less, so that the dasher-rod can be adjusted according to the amount of milk in the churn, the dasher-rod being adjusted in the forward holes when a greater quantity of milk is in the churn, and in the rear holes when the quantity of milk in the churn is small.

In adjusting the upper end of the dasher-rod laterally in the slot in the vibrating lever to vary the length of stroke of the dasher, according to the amount of milk in the churn, some provision must also be made to adjust correspondingly the churn, in order that the dasher-rod may always in its movements operate in the axis, or nearly in the axis, of the churn, to prevent the dasher from binding in the churn in its reciprocations. To accomplish this result of adjusting the churn-body I employ the following devices:

$q$ represents a supporting-board for the churn, pivoted at one end to one of the sills of the frame and provided at its opposite end, on its upper face, with a recess, in which the bottom of the churn rests. The lower face of the supporting-board is provided with three holes or perforations, corresponding with the holes in the sides of the slot in the vibrating lever, for the reception of a pin, $r$, projecting upward from one of the sills A, on which the supporting-board rests, to hold the supporting-board in its adjusted position.

The dasher-shaft is made in two parts, connected together by a sleeve rigidly secured to the upper part of the dasher-rod, and provided with holes near its lower end for the passage of a pin, passing also into a hole in the upper end of the lower part of the dasher-rod, whereby the dasher-rod can be lengthened or shortened.

$s$ represents an arm provided with a yoke, $t$, at one end, intended to straddle the dasher-rod and rest on the lid of the churn. The outer end of the arm $s$ is supported in a loop in the frame, and the arm s also passes through a loop, u, secured to the under face of a lever, v, pivoted in a slotted bracket secured to an upright of the frame, and provided with a series of adjusting-holes for the passage of a pin, by means of which the fulcrum of the lever is adjustable vertically. The outer or free end of the lever v passes through a slotted bracket secured to the frame and provided with a series of holes for the passage of a pin, by means of which the lever can be held in any desired position and the yoked arm adjusted to hold churns of different heights securely in place on the supporting-board during the churning operation.

The dasher and churn are of the ordinary form, and the latter may be made of wood, stone, or metal.

I am aware that a hinged yoke bearing upon the upper end of a churn to hold it securely in place, and adapted to be adjusted vertically for churns of different heights, has heretofore been employed, and I am also aware that a lever hinged in the churn-frame and adapted to be swung over, so as to rest on the top of a churn-body to hold it in place, the free end of the lever being locked in position when resting on the top of the churn, has also been employed, and I therefore lay no claim to such invention.

What I claim as my invention is—

1. The combination, with the vibrating lever h, provided with an elongated slot, k, having adjusting-holes for the upper end of the dasher-shaft, of the adjustable recessed supporting-board q, carrying the churn and pivoted to the churn-frame, substantially as described, and for the purpose set forth.

2. The combination, with a churn and an adjustable supporting-board, q, pivoted to the frame and provided with a recess for the churn-bottom and holes in its lower face, of the sill A, provided with a pin, r, substantially as described, and for the purpose set forth.

3. The combination, with the adjustable supporting-board q, churn p, and arm s, having its outer end supported in a loop secured to the frame and provided with the yoke t, of the lever v, having its fulcrum adjustable, and provided with the loop u, for the passage of the arm s, and a locking device at its outer end, whereby churns of varying heights and adapted to be adjusted laterally may be securely held in place on an adjustable supporting-board, substantially as described.

WILLIAM JAY DIXON.

Witnesses:
ALEXANDER PAYNE,
WILLIAM H. HATTEN.